(12) United States Patent
Liu

(10) Patent No.: US 11,738,400 B2
(45) Date of Patent: Aug. 29, 2023

(54) ADDITIVE MANUFACTURING SYSTEM AND ADDITIVE MANUFACTURING METHOD

(71) Applicant: AIRBUS (BEIJING) ENGINEERING CENTRE COMPANY LIMITED, Beijing (CN)

(72) Inventor: Ming Liu, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 106 days.

(21) Appl. No.: 17/177,679

(22) Filed: Feb. 17, 2021

(65) Prior Publication Data

US 2021/0252622 A1 Aug. 19, 2021

(30) Foreign Application Priority Data

Feb. 18, 2020 (CN) .......................... 202010099128.3

(51) Int. Cl.
*B23K 9/04* (2006.01)
*B23K 9/12* (2006.01)
(Continued)

(52) U.S. Cl.
CPC .............. *B23K 9/04* (2013.01); *B22F 10/25* (2021.01); *B22F 12/10* (2021.01); *B22F 12/13* (2021.01);
(Continued)

(58) Field of Classification Search
CPC ........ B23K 9/04; B23K 9/124; B23K 26/342; B23K 26/14; B23K 26/144; B23K 26/60;
(Continued)

(56) References Cited

U.S. PATENT DOCUMENTS

| 2007/0003416 A1* | 1/2007 | Bewlay | B23K 26/34 427/140 |
| 2007/0122562 A1* | 5/2007 | Adams | B33Y 40/00 427/532 |

(Continued)

FOREIGN PATENT DOCUMENTS

| CN | 104259666 A | 1/2015 |
| CN | 104625412 A | 5/2015 |

(Continued)

OTHER PUBLICATIONS

Lin Li et al., "Rapid additive manufacturing of functionally graded structures using simultaneous wire and powder laser deposition", Virtual and Physical Prototyping, vol. 1, No. 4, Dec. 2006, pp. 217-225.

(Continued)

*Primary Examiner* — John J Norton
*Assistant Examiner* — Simpson A Chen
(74) *Attorney, Agent, or Firm* — Nixon & Vanderhye P.C.

(57) ABSTRACT

An additive manufacturing system is disclosed including a material feeding device, a first heat source device and a second heat source device. The material feeding device is configured to feed the material onto a substrate for additive manufacturing. The first heat source device is configured to provide a main heat source for melting or sintering the material. The second heat source device is configured to provide an auxiliary heat source for melting or sintering the material. A type of the heat source provided by the first heat source device is different from a type of the heat source provided by the second heat source device. An additive manufacturing method is also disclosed. The additive manufacturing system and the additive manufacturing method according to the present application can improve the rate of the additive manufacturing, reduce the manufacturing cost, (Continued)

improve the stability of the molten pool and improve the manufacturing accuracy and the product quality.

9 Claims, 3 Drawing Sheets

(51) Int. Cl.
| | |
|---|---|
| B23K 26/342 | (2014.01) |
| B23K 26/14 | (2014.01) |
| B22F 12/41 | (2021.01) |
| B33Y 10/00 | (2015.01) |
| B33Y 30/00 | (2015.01) |
| B22F 10/25 | (2021.01) |
| B23K 26/348 | (2014.01) |
| B23K 26/144 | (2014.01) |
| B22F 12/10 | (2021.01) |
| B22F 12/13 | (2021.01) |

(52) U.S. Cl.
CPC .............. *B22F 12/41* (2021.01); *B23K 9/124* (2013.01); *B23K 26/144* (2015.10); *B23K 26/1464* (2013.01); *B23K 26/342* (2015.10); *B23K 26/348* (2015.10); *B33Y 10/00* (2014.12); *B33Y 30/00* (2014.12)

(58) Field of Classification Search
CPC ............... B23K 26/702; B23K 26/348; B23K 26/1464; B33Y 10/00; B33Y 30/00; B22F 12/41; B22F 10/25

USPC .......................................................... 219/75
See application file for complete search history.

(56) References Cited

U.S. PATENT DOCUMENTS

| | | | | |
|---|---|---|---|---|
| 2011/0151267 | A1* | 6/2011 | Withers | ................. B22F 3/115 |
| | | | | 427/457 |
| 2012/0234798 | A1* | 9/2012 | Lin | ........................ B23K 26/32 |
| | | | | 219/121.45 |
| 2016/0318130 | A1* | 11/2016 | Stempfer | ........... B23K 15/0086 |
| 2017/0165781 | A1 | 6/2017 | Veldsman et al. | |
| 2017/0190113 | A1* | 7/2017 | Calefati | .................. B22F 12/13 |
| 2017/0368637 | A1* | 12/2017 | Giese | .................... B23K 15/004 |
| 2018/0264726 | A1* | 9/2018 | Shiomi | ................... B22F 10/28 |
| 2018/0318929 | A1 | 11/2018 | Matthews et al. | |

FOREIGN PATENT DOCUMENTS

| | | |
|---|---|---|
| CN | 105414764 A | 3/2016 |
| CN | 107470619 A | 12/2017 |
| CN | 108161229 A | 6/2018 |
| WO | 2006133034 A | 12/2006 |

OTHER PUBLICATIONS

F. Wang et al. "Compositionally graded Ti6Al4V + TiC made by direct laser fabrication using powder and wire", Abstract Only, Materials & Design, vol. 28, Issue 7, 2007, pp. 2040-2046.

* cited by examiner

ADDITIVE MANUFACTURING SYSTEM AND ADDITIVE MANUFACTURING METHOD

CROSS REFERENCE TO RELATED APPLICATION

This application claims priority to Chinese Patent Application Number CN 202010099128-3, filed Feb. 18, 2020, the entire contents of which is hereby incorporated by reference.

FIELD OF THE INVENTION

The present application relates to the technical field of material processing and, in particular, to an additive manufacturing system and an additive manufacturing method which allow the material to be melted or sintered for additive manufacturing.

BACKGROUND

The additive manufacturing technology is a technology that melts or sinters materials by using a heat source to stack the materials layer by layer so as to form a solid part. The heat source of the additive manufacturing technology generally includes a laser, an electron beam and an electric arc. For a laser heat source, since the laser has a small light spot, a relatively small molten pool is formed, which causes a slow forming rate and is not beneficial to manufacturing a large-size structural component. For an electric arc heat source, compared with the laser heat source and the electron beam heat source, the manufacturing cost is relatively low and the forming rate is relatively high, but the surface quality of the product is poor and thus a secondary surface machining is generally required.

SUMMARY

An object of the present application is to provide an additive manufacturing system capable of improving the forming quality and accuracy while reducing the manufacturing cost and/or improving the forming rate.

Another object of the present application is to provide a laser-arc hybrid additive manufacturing system giving consideration to the forming rate, cost, the forming accuracy and quality.

An additive manufacturing system is provided according to an aspect of the present application. The additive manufacturing system includes a material feeding device, a first heat source device and a second heat source device. The material feeding device is arranged to feed material to a substrate for additive manufacturing. The first heat source device is adapted to provide a main heat source for melting or sintering the material. The second heat source device is adapted to provide an auxiliary heat source for melting or sintering the material. A type of the heat source provided by the first heat source device is different from a type of the heat source provided by the second heat source device. The additive manufacturing system can improve the rate of the additive manufacturing, reduce the manufacturing cost, improve the stability of the molten pool and ensure the manufacturing accuracy and the product quality.

The first heat source device and the second heat source device are provided in the additive manufacturing system of the present application for providing different types of heat source. The synergy coupling effect of the laser and the arc plasma can obtain relatively high energy gain and enable the molten pool to be stable, thereby improving the forming accuracy and quality. The two different heat sources can compensate for each other to reduce the sensitively and improve the adaptability.

In some examples of the additive manufacturing system, the first heat source device is a gas metal arc welding device or a gas tungsten arc welding device, and the second heat source device is a laser device. The material feeding device includes a wire feeding device used for feeding a wire material. Compared with using the laser device only, the coupling usage of the gas shielding welding device and the laser device can reduce the manufacturing cost and improve the forming rate. Compared with using the gas shielding welding device only, the coupling of arc plasma of the gas shielding welding and laser plasma of the laser device can improve stability of hybrid heat source and thus the forming quality and the accuracy of the product.

In some examples of the additive manufacturing system, the material feeding device further includes a nozzle for feeding a power material. The powder material and the wire material are made of the same material or different materials. On the one hand, the powder material different from the wire material can be provided by the nozzle, that is, the powder material is doped into the molten pool formed after the wire material is melted, so that the chemical composition of the product is changed and the metallurgical shape is improved, thereby changing the atomization or mechanical property of the forming product or the like. On the other hand, the powder material same as the wire material can be provided by the nozzle, so that the grain can be refined, the forming defect is reduced, and the mechanical property is improved.

In some examples of the additive manufacturing system, the nozzle has an inner wall and an outer wall, an annular space is formed between the inner wall and the outer wall to receive the powder material. And, the inner wall of the nozzle is configured to allow a laser of the second heat source device to pass through. As such, the structure of the additive manufacturing system can be more compact.

In some examples of the additive manufacturing system, the inner wall of the nozzle is coaxially arranged with the outer wall of the nozzle. The laser heat source passes through a space formed by the inner wall of the nozzle, and the powder material passes through an annular space between the inner wall and the outer wall. As such, the powder material substantially takes the laser heat source as a center, which is beneficial to allow the powder material to be evenly distributed and evenly heated.

In some examples of the additive manufacturing system, the nozzle includes a conical section which gradually tapers towards the substrate. The laser plasma and the powder stream can be shrunk by the conical section, thereby improving the energy density of the heat source.

In some examples of the additive manufacturing system, an electrode of the gas tungsten arc welding device and the wire material fed by the wire feeding device are located on the same side of the nozzle, and the wire material is located behind the nozzle in a product forming direction. Angles between the gas tungsten arc welding device, the nozzle and/or wire material relative to the substrate can be determined based on requirements of the material or the product, to obtain the best forming quality.

In some examples of the additive manufacturing system, an electrode of the gas tungsten arc welding device and the wire material fed by the wire feeding device are located on two opposite sides of the nozzle, and the wire material is located in front of the nozzle in the product forming direction. As such, the wire material can be preheated. In addition, the angle between the wire material and the substrate can be adjusted.

In some examples of the additive manufacturing system, an electrode of the gas metal arc welding device and the wire material fed by the wire feeding device are located on the same side of the nozzle, and the wire material is located behind the nozzle in the product forming direction.

In some examples of the additive manufacturing system, a temperature control device for heating the substrate and/or the material is further included. As such, the temperature gradient between the powder material and the molten pool can be decreased. Since the temperature gradient is reduced, the forming quality of the structural member produced with the additive manufacturing is improved.

An additive manufacturing method for the additive manufacturing system is provided according to another aspect of the present application. The additive manufacturing method includes the following steps: activating the first heat source device first to melt the wire material to form a molten pool; and activating the second heat source device after the molten pool is stable.

In some examples of the additive manufacturing system, the method further includes: feeding the powder material into the molten pool after the molten pool is stable, where the powder material and the wire material are made of the same material or the different materials.

Other advantages and features of the present application will be clear in the non-restrictive description hereinafter.

BRIEF DESCRIPTION OF THE DRAWING

The features and advantages of one or more embodiments of the present application will become more readily understood from the following description with reference to the accompanying drawings in which.

In all drawings, the corresponding reference numeral represents the corresponding part.

DETAIL DESCRIPTION OF EMBODIMENTS

The present application is described in detail hereinafter by means of exemplary embodiments with reference to the accompanying drawings. The following detailed description of the present application is for illustrative purpose only and is by no means intended to limit the present application and the applications or usages thereof.

Figure 1:
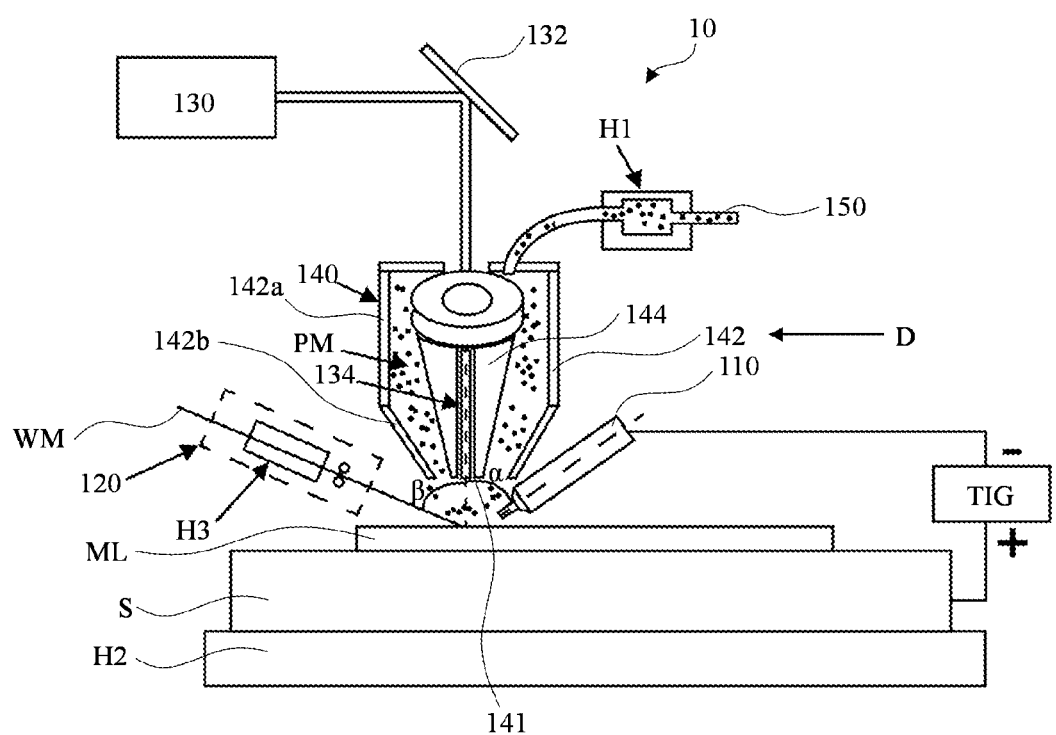
FIG. 1 is a schematic structural view of an additive manufacturing system according to an embodiment of the present application.

FIG. 1 is a schematic structural view of an additive manufacturing system 10 according to an embodiment of the present application. The additive manufacturing system 10 in FIG. 1 includes a TIG (Tungsten Inert Gas) welder 110, a wire feeding device 120, a laser 130, a nozzle 140, a substrate S, heaters H1 to H3 and the like.

The nozzle 140 is connected to a powder material source via a supply pipeline 150 to feed the powder material (powder-based material) PM onto the substrate S. The wire feeding device 120 is used for feeding the wire material WM onto the substrate S. A material feeding device used for feeding the material onto the substrate S for additive manufacturing is formed of the nozzle 140 and the wire feeding device 120. The material mentioned in the present application can be the wire material or the wire material doping with the powder material. It will be appreciated that feeding rates of the powder material PM and the wire material WM can be changed as required. The wire material and the powder material can be made of the same material or the different materials. The powder material can be powder material of metal or ceramic.

It will be appreciated that the present application is not limited to the specific embodiments illustrated. For example, only the wire material WM can be fed onto the substrate S.

The TIG welder 110 and the laser 130 are used together for allowing the materials fed onto the substrate S to be melted or sintered to form a material layer ML. The final product is formed by overlaying the material layers ML layer by layer.

The TIG welder 110 forms a first heat source device configured to provide a heat source for melting or sintering the material. The TIG welder 110 belongs to a gas tungsten arc welding (GTAW) device. The TIG welder 110 melts or sinters the material by heating the material with an electric arc.

The laser 130 forms a second heat source device configured to provide a heat source for melting or sintering the material. The laser 130 generates a laser beam 134, and the laser beam is illuminated onto the material via a mirror 132. The laser 130 melts or sinters the material by heating the material with the laser beam 134. Generally, a size of a light spot of the laser 130 is related to a diameter of the wire material WM, a process parameter and the like.

The TIG welder 110 can be used as a main heat source used for melting the material, and the laser 130 can be used as an auxiliary thermal source used for melting the material. The TIG welder 110 has a relatively large electric arc heating zone, and the laser 130 has a relatively small light spot illuminating zone. The temperature and the stability of the molten pool can be improved under the combined action of the TIG welder 110 and the laser 130, and the forming accuracy and quality are improved. The scanning rate of the laser beam can be increased and the requirement of the power of the laser can be reduced due to the synergy coupling effect of the electric arc heat source and the laser heat source.

Compared with the additive manufacturing system by using the laser beam as the heat source only, the additive manufacturing system including the TIG welder 110 and the laser 130 in the present application can significantly improve the forming rate, reduce the manufacturing cost, reduce the sensitivity and improve the adaptability. Compared with the additive manufacturing system by using the electric arc as the heat source only, the additive manufacturing system including the TIG welder 110 and the laser 130 in the present application can improve the quality of the forming product.

The nozzle 140 is configured to feed a powder material PW onto a substrate S for additive manufacturing. The wire material WM can be used as a main material of the forming product. And, the powder material PM can be used as a doping material of the forming product to change the property of the product. The composition or quantity of the powder material can be changed based on the requirement of the property of the product to be formed.

The nozzle 140 has an inner wall 144 and an outer wall 142. An annular space is formed between the inner wall 144 and the outer wall 142 to receive the powder materials PM. An interior space limited by the inner wall 144 allows the laser beam 134 to pass through. An opening 141 can be arranged at a lower end of the outer wall 142 to lay the powder materials PM in the annular space onto the substrate S. The powder materials PM coming out of the opening 141 surround the laser beam 134 to enable the powder materials PM to be evenly heated and melted. In other words, the powder materials PM coming out of the opening 141 can accurately fall into the effective heat source zone.

The inner wall 144 and the outer wall 142 of the nozzle 140 can be coaxially arranged, that is, a central axis of the inner wall 144 coincides with a central axis of the outer wall 142. In an example in FIG. 1, the inner wall 144 of the nozzle 140 is approximately conical. The outer wall 142 has a cylindrical section 142*a* and a conical section 142*b* which gradually tapers towards the substrate S. The opening 141 is formed at a lower end portion of the conical section 142*b*. The laser beam and a powder stream can be concentrated by the conical section 142*b*, thereby improving the energy density of the heat source. It will be appreciated that the shape of the nozzle 140 is not limited to the specific embodiments illustrated, and can be changed as specifically required.

A heater H1 can be arranged on the supply pipeline 150 to heat the powder materials. Before or during the additive manufacturing, the feeding powder material can be heated and/or its temperature can be kept within a predetermined range by the heater HE A temperature gradient between the powder material and the melting temperature thereof can be reduced by arranging the heater H1, thus improving the quality of the forming product.

A heater H2 can be arranged on one side of the substrate S (a lower side in the figure) to heat the substrate S. Before, during or after the additive manufacturing, the substrate S can be heated by the heater H2. Then, the substrate S can heat the material layer ML and/or keep its temperature within the predetermined range. The stress deformation and the like of the forming product can be reduced by arranging the heater H2.

A heater H3 can be arranged on a path along which the wire material WM is fed to heat the wire material WM. Before or during the additive manufacturing, the feeding wire material WM can be heated and/or its temperature can be kept within a predetermined range by the heater H3. A temperature gradient between the wire material WM and the melting temperature thereof can be reduced by arranging the heater H3, thus improving the quality of the forming product.

The heaters H1 to H3 form the temperature control device in the present application. The temperature control device can be a resistance temperature control device or an electromagnetic temperature control device. It will be appreciated that the temperature control device can also be any another suitable temperature control device, for example, of an electron beam. It will be appreciated that the number, position and the like of the heaters can be changed as required and not limited to the specific examples illustrated. For example, any combination of the heater H1 to heater H3 can be chosen to use as required.

In the example in FIG. 1, the nozzle 140 is arranged substantially perpendicular to the substrate S, that is, the central axis of the nozzle 140 is substantially perpendicular to the substrate S. It will be appreciated that the nozzle 140 can be arranged at a certain angle relative to the substrate S as required, and not perpendicular to the substrate S as shown in the figure.

In the example in FIG. 1, the wire material WM fed by the wire feeding device 120 and the electrode of the TIG welder 110 are located on two opposite sides of the nozzle 140. In a forming direction D (or, a moving direction of the TIG welder 110 and the laser 130) of the product, the wire material WM fed by the wire feeding device 120 is in front of the nozzle 140 (or the electrode of the TIG welder 110). It will be appreciated that, in the forming direction D of the product, the wire material fed by the wire feeding device 120 can be located behind the nozzle 140 (or the electrode of the TIG welder 110), that is, the electrode of the TIG welder 110 is located in front of the nozzle 140.

It will be appreciated that, the wire material WM fed by the wire feeding device 120 and the electrode of the TIG welder 110 can be located on the same side of the nozzle 140. In this case, the wire material WM can be located in front of or behind the nozzle 140 in the forming direction D of the product. In a case that the wire material WM is located in front of the nozzle 140, the wire material WM can be preheated. In a case that the wire material WM is located behind the nozzle 140, a cooling rate of the molten pool can be reduced.

The TIG welder 110 can be arranged such that the electrode is at an angle $\alpha$ with respect to a vertical direction. The wire feeding device 120 can be arranged such that the wire material WM is at an angle $\beta$ with respect to the vertical direction. It will be appreciated that, the angles $\alpha$ and $\beta$ can be changed as required.

Figure 2:
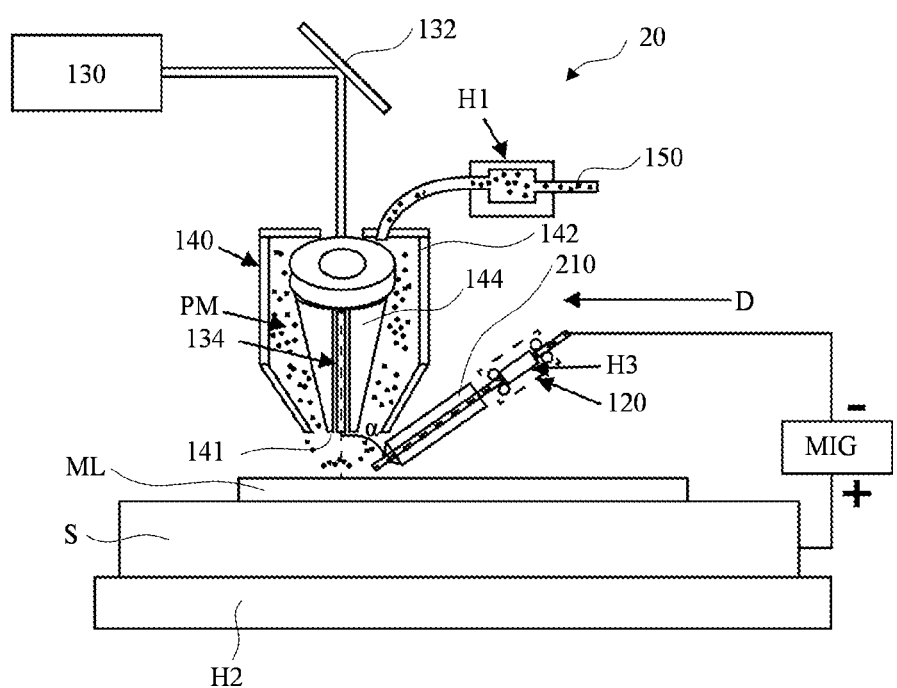
FIG. 2 is a schematic structural view of the additive manufacturing system according to another embodiment of the present application.

FIG. 2 is a schematic structural view of an additive manufacturing system 20 according to another embodiment of the present application. The same portion between the additive manufacturing system 20 in FIG. 2 and the additive manufacturing system 10 in FIG. 1 is represented by the same reference numeral, and the detailed description thereof is omitted. Hereinafter, a portion of the additive manufacturing system 20 in FIG. 2 that is different from the additive manufacturing system 10 in FIG. 1 will be described in detail.

The portion of the additive manufacturing system 20 in FIG. 2 that is different from the additive manufacturing system 10 in FIG. 1 is that a MIG (Metal-Inert Gas) welder 210 is used as the main heat source. The MIG welder 210 belongs to the gas metal arc welding (GMAW) device. Similar to the TIG welder 110, the MIG welder 210 provides an electric arc heat source used for melting or sintering the materials.

As shown in FIG. 2, the MIG welder 210 is located on the same side of the nozzle 140 with the wire feeding device 120. Moreover, in the forming direction D (or the moving direction of the MIG welder 210 and the laser 130) of the product, the MIG welder 210 and the wire feeding device 120 are located behind the molten pool, that is, the wire material is located behind the nozzle 140, so that the cooling rate of the molten pool can be reduced.

In an example in FIG. 2, since the MIG welder 210 is used as the main heat source, a current of the electric arc is relatively large, a melting rate of the wire material is faster and the forming rate of the additive manufacturing is faster, the potential of forming large-size parts is greater. In contrast, in the example in FIG. 1, since the TIG welder 110 is used as the main heat source, the state of the electric arc is more stable, the formed molten pool is also more stable, the structure of the forming member is more uniform and the property is better. The MIG welder 210 and the TIG welder 110 can be applicable to various metals, such as alloy steel, stainless steel, aluminum and aluminum alloy, copper and copper alloy, titanium alloy and the like.

The MIG welder 210 and the TIG welder 110 can be chosen to use as the main heat source based on the wire material and the powder material to be used.

It will be appreciated that the present application is not limited to the specific examples illustrated. A suitable welder can be adopted as required, and the welder and the wire feeding device can also be located in front of the molten pool, such that the wire material WM can be preheated.

Figure 3:
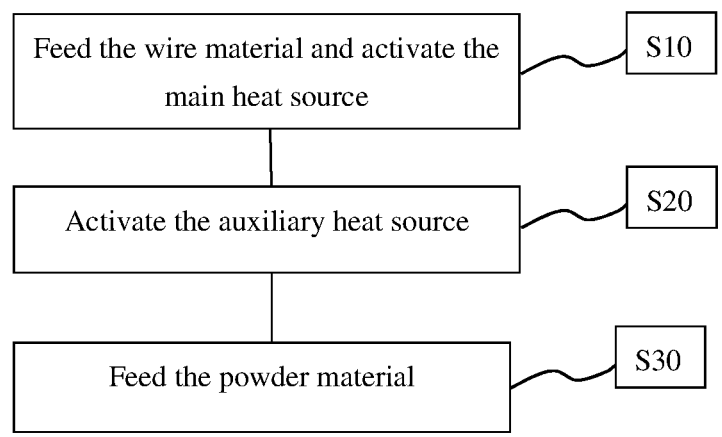
FIG. 3 is a flowchart of an additive manufacturing method according to an embodiment of the present application.

FIG. 3 is a flowchart of an example of an additive manufacturing method according to the present application. As shown in FIG. 3, in Step S10, the main heat source is activated first, for example, the MIG welder 210 or the TIG welder 110, to melt the fed wire material to form the molten pool. After the molten pool is stable, in Step S20, the auxiliary thermal source can be activated, for example, the laser 130.

In an example in FIG. 3, compared with a traditional single heat source, the coupling effect of two heat sources can optimize the forming rate and the forming accuracy.

In the example in FIG. 3, the powder material can also be added into the molten pool after the molten pool is stable (Step S30). The powder material can be made of the same material as the wire material or the different materials from the wire material. If the powder material is same as the wire material, the grain can be refined and the forming quality can be improved. If the powder material is different from the wire material, the property of the product can be changed as required.

While the present application has been described with reference to the exemplary embodiment, it will be appreciated that the present application is not limited to the specific embodiments/examples described and illustrated in detail herein. The person skilled in the art can make various variants to the exemplary embodiment without departing from the scope defined by the claims.

The invention claimed is:

1. An additive manufacturing system, comprising:
   a powder material feeding device configured to feed powder materials onto a substrate for additive manufacturing;
   a first heat source being a gas metal arc welding device or a gas tungsten arc welding device configured to provide a main heat source for melting or sintering the material; and
   a second heat source being a laser device configured to provide an auxiliary heat source for melting or sintering the material, and a mirror, wherein a laser beam generated from the laser device is reflected on the material via the mirror;
   a wire feeding device configured to feed a wire material;
   wherein the powder material and the wire material are of same material or different materials;
   a nozzle;
   a supply pipeline for supplying the powder materials to the nozzle from a source, wherein the supply line comprises a distal end connected to the nozzle and a proximal end connected to the source;
   a heater disposed on the supply pipeline between the distal end and the proximal end, and configured to heat the powder material; and
   wherein the nozzle has an inner wall and an outer wall, an annular space is formed between the inner wall and the outer wall containing the powder material, and the inner wall of the nozzle is configured to allow a laser beam generated by the laser device to pass through.

2. The additive manufacturing system according to claim 1, wherein the inner wall of the nozzle is coaxially arranged with the outer wall of the nozzle.

3. The additive manufacturing system according to claim 2, wherein the nozzle comprises a conical section which tapers towards the substrate.

4. The additive manufacturing system according to claim 1, wherein the first heat source is a gas tungsten arc welding device having an electrode, wherein the electrode and the wire material fed by the wire feeding device are located on a same side of the nozzle, and the wire material is located behind the nozzle in a product forming direction.

5. The additive manufacturing system according to claim 1, wherein the first heat source is a gas tungsten arc welding device and the wire material fed by the wire feeding device are located on two opposite sides of the nozzle, and the wire material is located in front of the nozzle in a product forming direction.

6. The additive manufacturing system according to claim 1, wherein the first heat source is a gas metal arc welding device having an electrode, wherein the electrode and the wire material fed by the wire feeding device are located on a same side of the nozzle, and the wire material is located behind the nozzle in a product forming direction.

7. The additive manufacturing system according to claim 1, further comprising a temperature control device configured to heat and/or keep temperature of the substrate and/or the material.

8. An additive manufacturing method for an additive manufacturing system comprising:
   a powder material feeding device configured to feed powder materials onto a substrate for additive manufacturing;
   a first heat source being a gas metal arc welding device or a gas tungsten arc welding device configured to provide a main heat source for melting or sintering the material; and
   a second heat source being a laser device configured to provide an auxiliary heat source for melting or sintering the material, and a mirror, wherein a laser beam generated from the laser device is reflected on the material via the mirror;
   a wire feeding device configured to feed a wire material;
   wherein the powder material and the wire material are of same material or different materials;
   a nozzle;
   a supply pipeline for supplying the powder materials to the nozzle from a source, wherein the supply line comprises a distal end connected to the nozzle and a proximal end connected to the source;
   a heater disposed on the supply pipeline between the distal end and the proximal end, and configured to heat the powder material; and
   wherein the nozzle has an inner wall and an outer wall, an annular space is formed between the inner wall and the outer wall containing the powder material, and the inner wall of the nozzle is configured to allow a laser beam generated by the laser device to pass through,
   the method comprising:
   activating the first heat source device firstly to melt the wire material to form a molten pool; and
   activating the second heat source device after activating the first heat source.

9. The additive manufacturing method according to claim 8, further comprising:
   feeding the powder material into the molten pool.

* * * * *